US012672740B2

(12) United States Patent
Rose

(10) Patent No.: US 12,672,740 B2
(45) Date of Patent: Jul. 7, 2026

(54) SMOKER

(71) Applicant: James A. Rose, Murrysville, PA (US)

(72) Inventor: James A. Rose, Murrysville, PA (US)

( * ) Notice: Subject to any disclaimer, the term of this patent is extended or adjusted under 35 U.S.C. 154(b) by 156 days.

(21) Appl. No.: 18/206,879

(22) Filed: Jun. 7, 2023

(65) Prior Publication Data

US 2023/0389751 A1 Dec. 7, 2023

Related U.S. Application Data

(60) Provisional application No. 63/349,810, filed on Jun. 7, 2022.

(51) Int. Cl.
*A47J 37/07* (2006.01)

(52) U.S. Cl.
CPC ................................. *A47J 37/0713* (2013.01)

(58) Field of Classification Search
CPC .... A47J 37/0713; A47J 37/07; A47J 37/0704; A47J 37/0718; A47J 37/0754
USPC ........................................................ 126/25 R
See application file for complete search history.

(56) References Cited

U.S. PATENT DOCUMENTS 4,700,618 A * 10/1987 Cox, Jr. ................. A23B 4/052
99/481
6,050,177 A 4/2000 Lassig, Jr.

6,913,011 B1 * 7/2005 Snider ................. A47J 37/0704
99/450
9,186,020 B1 11/2015 Phillips
9,585,518 B1 3/2017 Phillips
11,172,688 B2 11/2021 Powell et al.
2003/0150336 A1 8/2003 Roescher
2007/0121234 A1 5/2007 Abe
2017/0164783 A1 * 6/2017 Sauerwein .......... A47J 37/0786
2018/0168397 A1 * 6/2018 Colston ............... A47J 37/0704
2018/0368617 A1 * 12/2018 Allmendinger ..... A47J 37/0704

OTHER PUBLICATIONS https://www.atbbq.com/products/yoder-smokers-ys640s-pellet-grill-with-acs. Last accessed Oct. 17, 2023.
https://www.amazon.com/recteq-RT-700-Pellet-Wi-Fi-Enabled-Electric/dp/B0BN6W7LT3/ref=sr_1_1_sspa?hvadid=664614837040&hvdev=c&hvlocphy=9021431&hvnetw=g&hvqmt=e&hvrand=7665953290042752415&hvtargid=kwd-787243800184&hydadcr=25226_13642183&keywords=rec+tec+grills+bull+rt+700&qid=1697553701&sr=8-1-spons&sp_csd=d2lkZ2V0TmFtZT1zcF9hdGY&psc=1. Last accessed Oct. 17, 2023.
https://www.traeger.com/pellet-grills/pro/575?gclid=EAlalQobChMI4eLyuaj9gQMVVP7ICh3udwG9EAQYASABEglvifD_BwE. Last accessed Oct. 17, 2023.

* cited by examiner

*Primary Examiner* — Connor J Tremarche
(74) *Attorney, Agent, or Firm* — David G. Oberdick; Michael G. Monyok

(57) ABSTRACT

The present invention is directed to a smoker device for smoking and cooking food that has improved smoke circulation in the smoking chamber, less smoke loss from the areas outside of the exhaust pipe and is easier to clean than existing technologies.

19 Claims, 9 Drawing Sheets

$P_1$ = Atmospheric Pressure $P_1 \geq P_2$ $T_0 < T_1 < T_2 < T_3$

SMOKER

CROSS-REFERENCE TO RELATED APPLICATION

This application claims priority to U.S. Provisional Application Ser. No. 63/349,810, filed Jun. 7, 2022, which application is incorporated by reference herein in its entirety.

BACKGROUND OF THE INVENTION

Field of the Invention

The present invention is an improved device to cook and/or smoke food.

Description of Related Art

Historically, smoking has been a method of cooking meat or other foods over a fire usually with the addition of wood chips to impart a smoky flavor to the food. Nowadays it is common to smoke all sorts of meat, fish, and a wide variety of other foods. Smoking is accomplished in smokers, which are devices specifically designed to smoke foods. Additionally, foods can be smoked in hybrid smoker-grills, which are grills that are designed with smoking capabilities. Finally, foods can be smoked on regular grills (or on stovetops or in ovens) by using special equipment that converts the grill, stovetop, or oven into a smoking environment. It is generally accepted in the field that specifically designed smokers are the most effective and efficient devices for smoking foods, followed by hybrid smoker-grills and then by all other smoking devices.

Hot smoking is the process whereby meat (or any food) is slowly cooked and smoked simultaneously. In a smoker, the air temperature is increased and carefully controlled to raise the meat temperature to produce a fully cooked food product in a smoking environment. A smoker usually is an outdoor cooker that enables the smoking of food usually in a home or restaurant setting.

Some variations of the present invention fall within a sub-category of smokers known as pellet smokers. Pellet smokers are a combination of an oven and a smoker that can be used as an oven, grill, and/or smoker. Pellet smokers use pellets (usually compressed sawdust) that sit in a hopper on the side of the smoker and are fed into a firebox. The firebox is designed to cause the pellets to combust, which creates smoke and heat in the cooking chamber. Ideally, a pellet smoker has a built-in thermometer to keep the temperature stable. Pellet smokers can be designed to automatically change the airflow and the amounts of pellets being fed into the firebox to create a consistent heat.

There are several problems and concerns that exist in the field of smoking foods that the present invention addresses. First is the movement of gas within the cooking chamber. Some commercial devices rely upon the use of a fan in the cooking chamber to circulate the heat and smoke throughout the chamber. The design of the present invention does not necessitate a fan for this purpose. The present invention achieves smoke circulation without the need of any additional fans or equipment in the cooking space.

Second is the problem of containing the smoke within the chamber. A notable problem plaguing most smokers and smoker-grills on the market today is that there is a significant amount of smoke that leaks from the devices during the cooking/smoking process. This smoke pollutes the air around the smoker, making it difficult for people to stand near or around the smoker. It also makes it almost impossible to use traditional smokers indoors or in semi-enclosed settings. The present invention has eliminated a significant amount of smoke leakage from any part of the smoker except the exhaust assembly, which is the location designed for the exhaust of the heat and smoke. While the present invention will be used predominately outdoors, there are still significant advantages to decreasing the amount of smoke that leaks from various areas of the smoker.

Finally, grease clean-up and management are an on-going struggle with smokers. It is dangerous to have significant grease dripping onto the pellets. The design of the present invention's smoking chamber causes the grease to drip down into one easy to clean location. The present invention also has numerous other advantages described more fully herein.

BRIEF SUMMARY OF THE INVENTION

The following is a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description and explanation that is presented later.

A first embodiment of the present invention is a smoker device for smoking or cooking food that comprises: a smoking chamber divided into a first sub-chamber oriented at least partially below a second sub-chamber; an exhaust pipe located within the first sub-chamber and above the firepot in the first sub-chamber, the exhaust pipe having at least one inlet and an outer end extending out of the smoking chamber; and an exhaust stack connected to the outer end of the exhaust pipe and extending upward to vent hot air and smoke from the smoking chamber. In this embodiment, the heating of the air in the exhaust pipe creates a draw of air and smoke within the smoking chamber through the at least one inlet and up the exhaust stack and further creates a circular convection current of air and smoke within the smoking chamber.

A second embodiment of the present invention includes the elements previously described, wherein the smoking chamber comprises: a top; a bottom; at least one side connected to the top and bottom to enclose the smoking chamber; and at least one door on one of the at least one sides. In a third embodiment, this smoker device also comprises a support structure upon which rests a hopper assembly and the smoking chamber.

A fourth embodiment of the present invention incorporates the elements of the first invention and the exhaust pipe extends substantially horizontally through the first sub-chamber.

These various embodiments of the present invention can be configured to include at least one grate mounted horizontally within the smoking chamber; at least one drip pan mounted within the smoking chamber below the at least one grate in an angled orientation, whereby the drip pan slopes downward toward the at least one side of the smoking chamber; and a grease catcher. Similarly, the various embodiments of the present invention can be configured to incorporate a chase connecting the first and second sub-chambers.

Another embodiment of the present invention is a smoker device comprising: a smoking chamber comprising a first sub-chamber configured to house a firepot and an exhaust pipe and a second sub-chamber housing a cooking surface; wherein the temperature inside the first sub-chamber is the highest temperature in the smoking device and wherein the pressure inside the smoking chamber is equal to or lower than the pressure outside the smoking chamber to draw smoke through the smoker device.

Various embodiments of the device described in the previous paragraph can be configured to incorporate a chase that is connected to and joining the first and second sub-chambers to each other and/or to function such that the smoke and other combustion gasses generated by the firepot located in the first sub-chamber are directed, through configuration of the smoking chamber, to follow a circulation path across the cooking surface and then enter the exhaust pipe under the cooking surface.

Another embodiment of the present invention is a smoker device comprising: a smoking chamber comprising a first sub-chamber configured to house a firepot and having an exhaust pipe located within it and a second sub-chamber having a cooking surface located within it; wherein pressure inside the smoking chamber is equal to or lower than the pressure outside the smoking chamber to draw smoke through the smoker device. Alternative embodiments of this device can be configured such that the pressure inside the smoking chamber is created by a mechanism selected from the group consisting of a fan, by creating a venturi effect, and/or by creating a draft in the exhaust pipe by heating the exhaust pipe and gases within it.

Another embodiment of the present invention is a smoker device comprising: a smoking chamber; a heat source located within the smoking chamber; an exhaust pipe for venting exhaust gases from inside the smoking chamber and that is located within the smoking chamber and above the heat source, whereby the heat source heats the exhaust gases in the exhaust pipe to create or increase the draft in the exhaust pipe. A variation on this embodiment can be configured such that the exhaust gases in the exhaust pipe are reheated to a higher temperature whereby the exhaust process accelerates, and negative pressure is created within the smoker device.

Another embodiment of the present invention is a heating device wherein heat is generated by the burning of pellets or other combustible fuel comprising: a heating chamber; and a hopper assembly that houses the pellets or other combustible fuel, wherein the hopper assembly is slidably detachable from the heating chamber.

One additional embodiment of the present invention is a smoker device that comprises a smoking chamber containing a sub-chamber; a firepot within the sub-chamber; an exhaust pipe with at least one inlet, the exhaust pipe located above the firepot, whereby the firepot reheats the air and smoke within the exhaust pipe and, thereby, increases the draw in the smoking chamber.

Any of the embodiments described herein can be configured so that the draw is created by a negative pressure that exists between a lower ambient temperature outside of the smoking chamber and a higher temperature inside the exhaust pipe above the firepot. Similarly, any of the embodiments described herein can be configured so that all heated air and smoke within the smoking chamber is routed through the exhaust and outside the smoking chamber.

BRIEF DESCRIPTION OF THE SEVERAL VIEWS OF THE DRAWINGS

To facilitate understanding of the invention, the drawings and description illustrate preferred embodiments thereof, from which the invention, various embodiments of its structures, construction and method of operation, and many advantages, may be understood and appreciated. The drawings are incorporated by reference.

DETAILED DESCRIPTION OF THE INVENTION

Figure 1A:
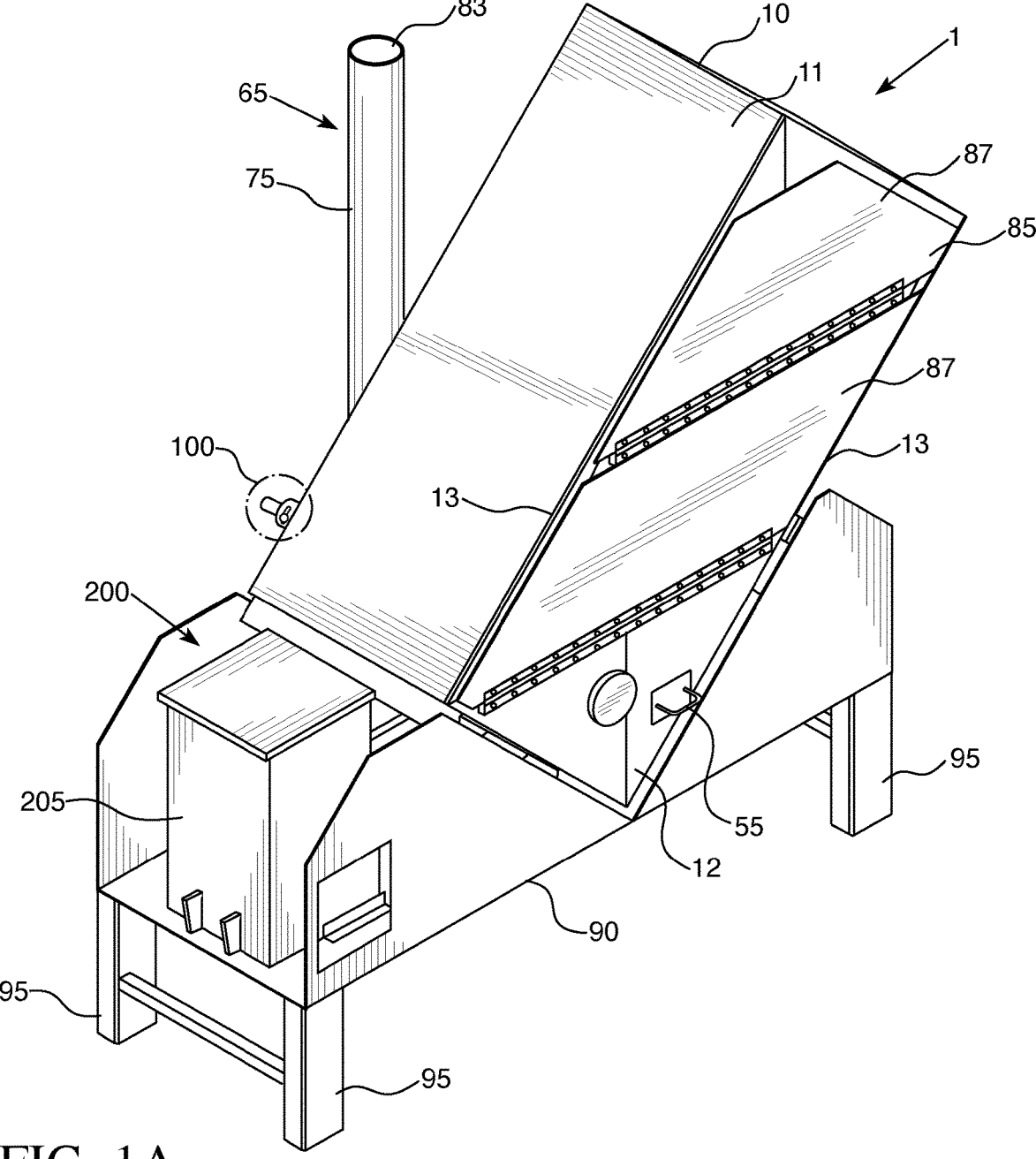
FIG. 1A is a perspective view of one embodiment of a smoker device according to the present invention.

The following describes example embodiments in which the present invention may be practiced. This invention, however, may be embodied in many ways, and the descriptions provided should not be construed as limiting. The following invention may be embodied as methods, systems, or devices. These detailed descriptions should not be taken in a limiting sense. The accompanying drawings are hereby incorporated by reference.

In this document, the terms "a" or "an" are used, as is common in patent documents, to include one or more than one. In this document, the term "or" is used to refer to a nonexclusive "or" such that "A or B" includes "A but not B," "B but not A," and "A and B," unless otherwise indicated. All publications, patents, and patent documents referred to in this document are incorporated by reference herein in their entirety, as though individually incorporated by reference. If inconsistent usages occur between this document and those documents so incorporated by reference, the usage in the incorporated reference(s) should be considered supplementary to that of this document; for irreconcilable inconsistencies, the usage in this document controls.

While the disclosure has been described in detail and referring to specific embodiments thereof, it will be apparent to one skilled in the art that various changes and modifications can be made without departing from the spirit and scope of the embodiments. Thus, it is intended that the present disclosure covers the modifications and variations of this disclosure provided they come within the scope of the appended claims and their equivalents.

For the description, the terms "upper", "lower", "right", "left", "vertical", "horizontal", "top", "bottom", "lateral", "longitudinal", and derivatives thereof shall relate to the invention as it is oriented in the figures. However, it is to be understood that the invention may assume alternative variations and step sequences, unless specified to the contrary. It also is to be understood that the specific devices and processes illustrated in the attached drawings and described in this specification are simply exemplary embodiments of the invention. Hence, specific dimensions and other physical characteristics related to the embodiments disclosed are not to be limiting.

The present invention is a smoker device 1 in the category of pellet cookers, barbeques, smokers, grills, and hybrid smoker-grills. The inventions described herein can be used as, incorporated into, and modified for use with barbeques, smokers, grills, hybrid smoker-grills, and pellet cookers. For ease of discussion herein, all such devices are referred to collectively as a "smoker device 1." Additionally, while the primary embodiments are described as using "pellets 40" for fuel this invention is adaptable for use with any type of combustible fuel including but not limited to pellets, wood, charcoal, propane, and natural gas. Additionally, the phrase "smoking chamber 10" includes a chamber in which food is heated, smoked, cooked, or any combination thereof. Most embodiments of a smoker device 1 of the present invention that utilize pellets 40 comprise two primary structures: (1) a smoking chamber 10, and (2) a pellet hopper assembly 200. In most, but not all, embodiments of the present invention, the smoking chamber 10 and the pellet hopper assembly 200 are removably connected to one another and are supported by a support structure 90.

Figure 3:
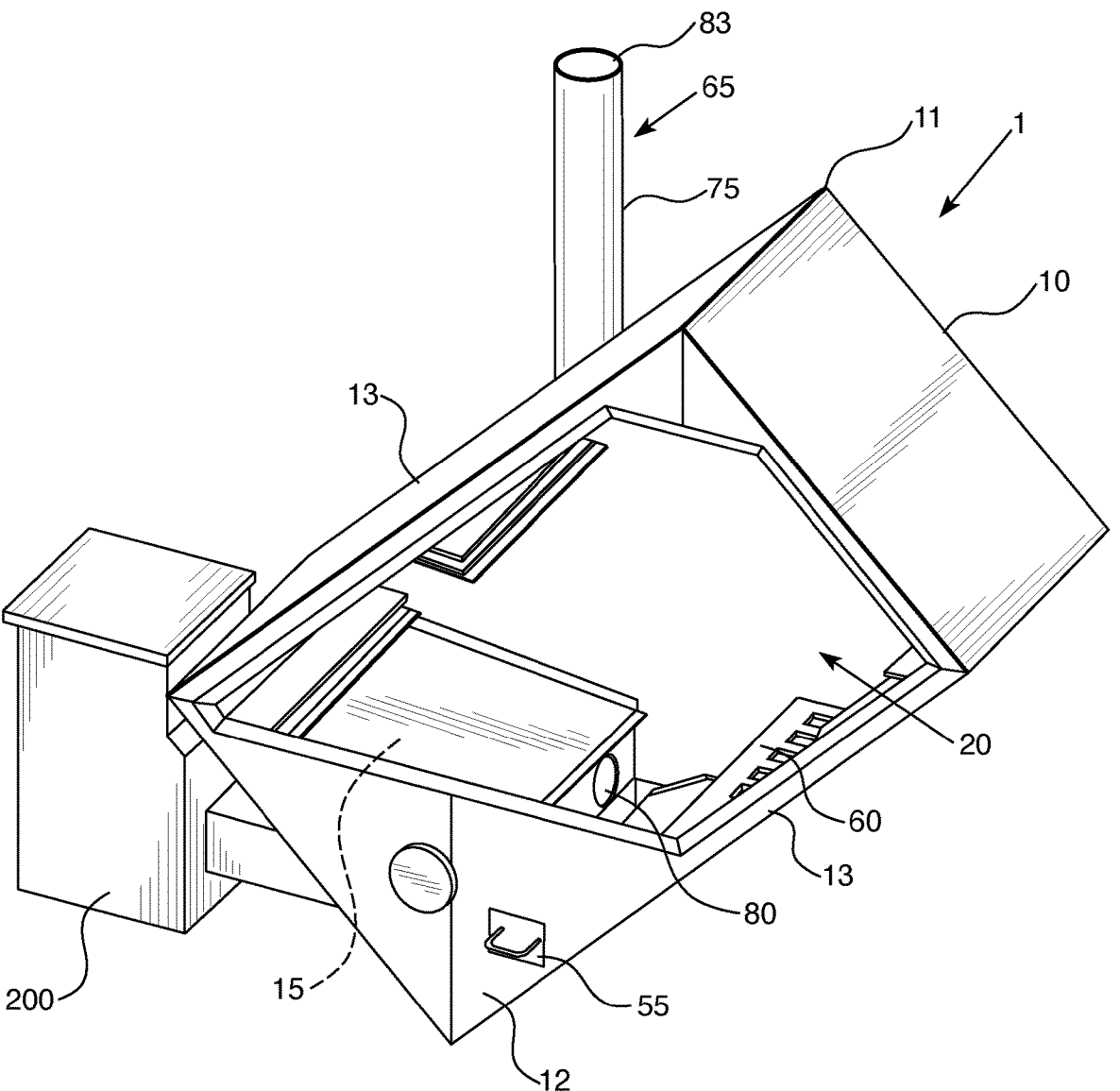
FIG. 3 is an alternative view of one embodiment of a smoker device according to the present invention with a cut-away side to reveal the interior of this one embodiment of the smoker device.
Figure 4A:
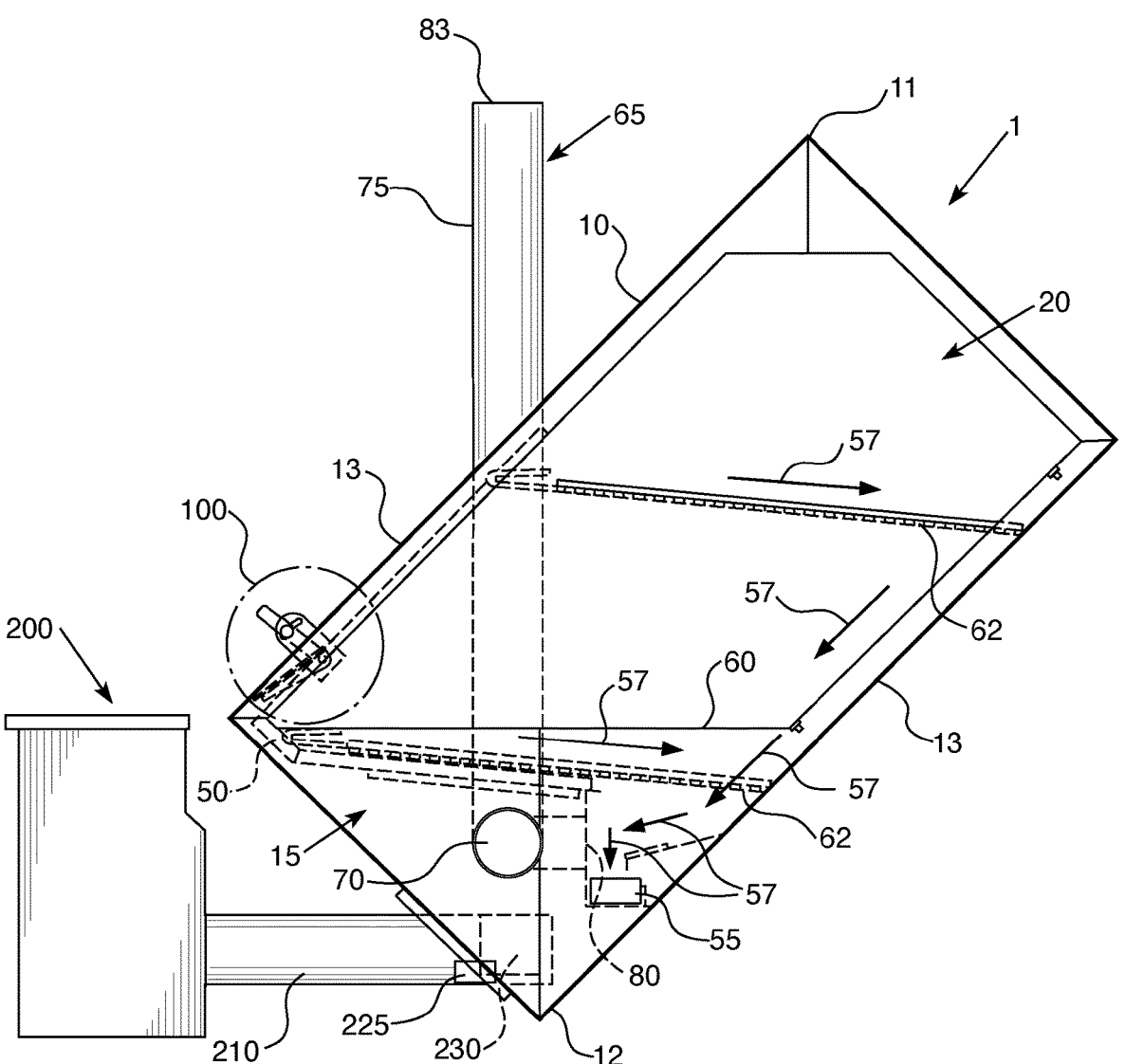
FIGS. 4A through 4D illustrate the slanted drip pans of one embodiment of the present invention, the movement of grease within the cooking chamber, and the optional damper of various embodiment of the present invention.
Figures 4B, 4C:
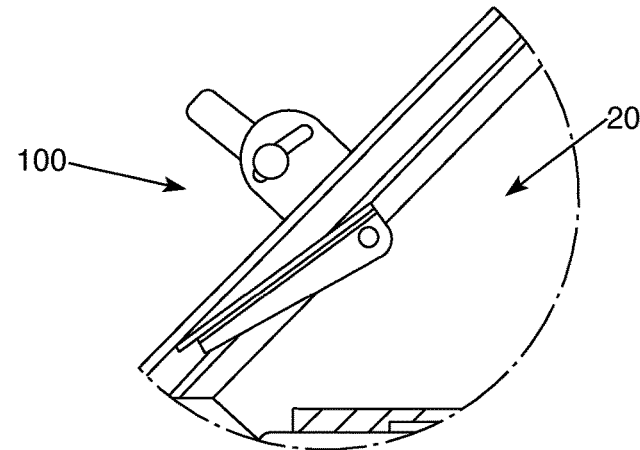
Figure 4D:
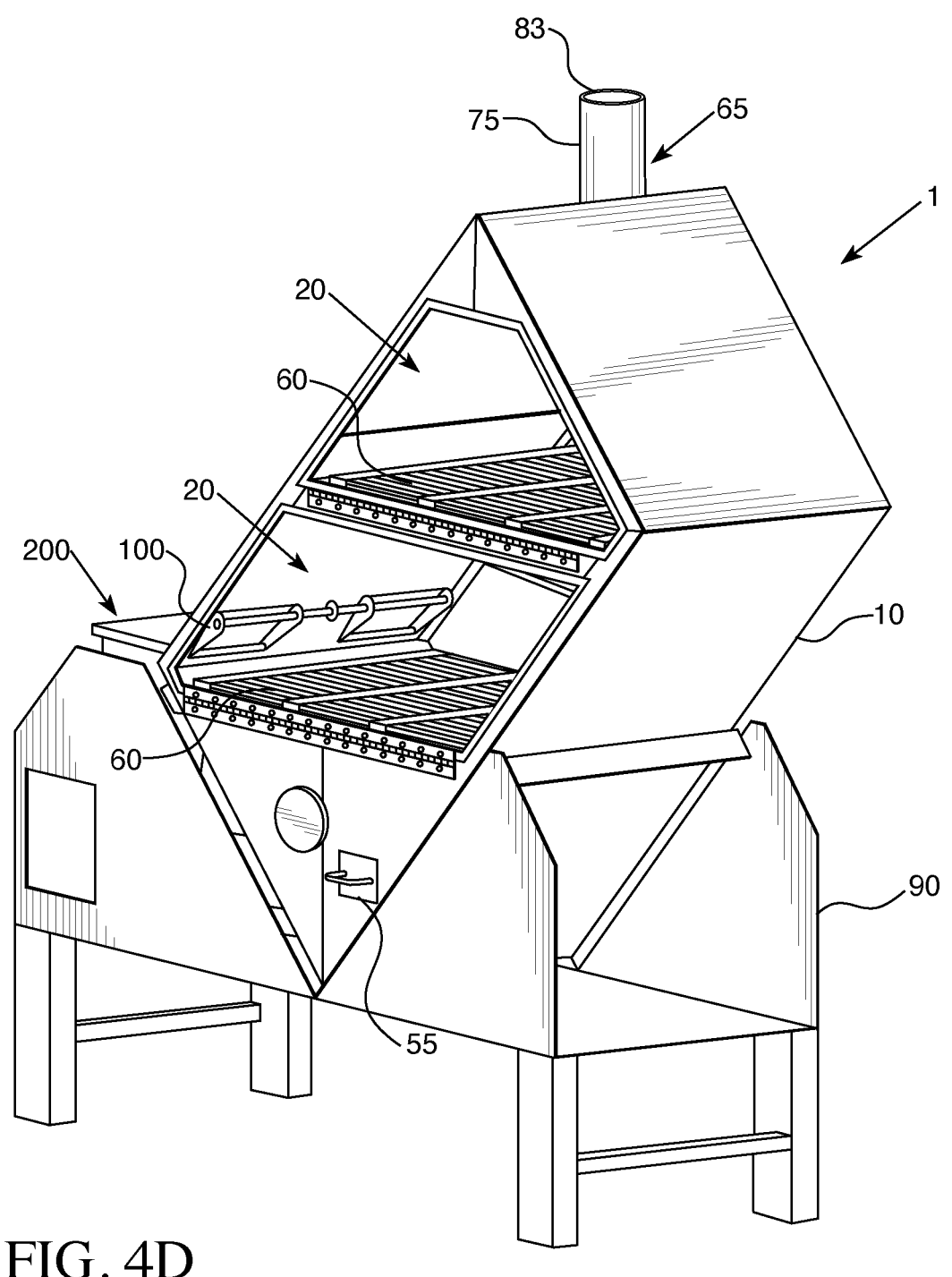
Figure 5:
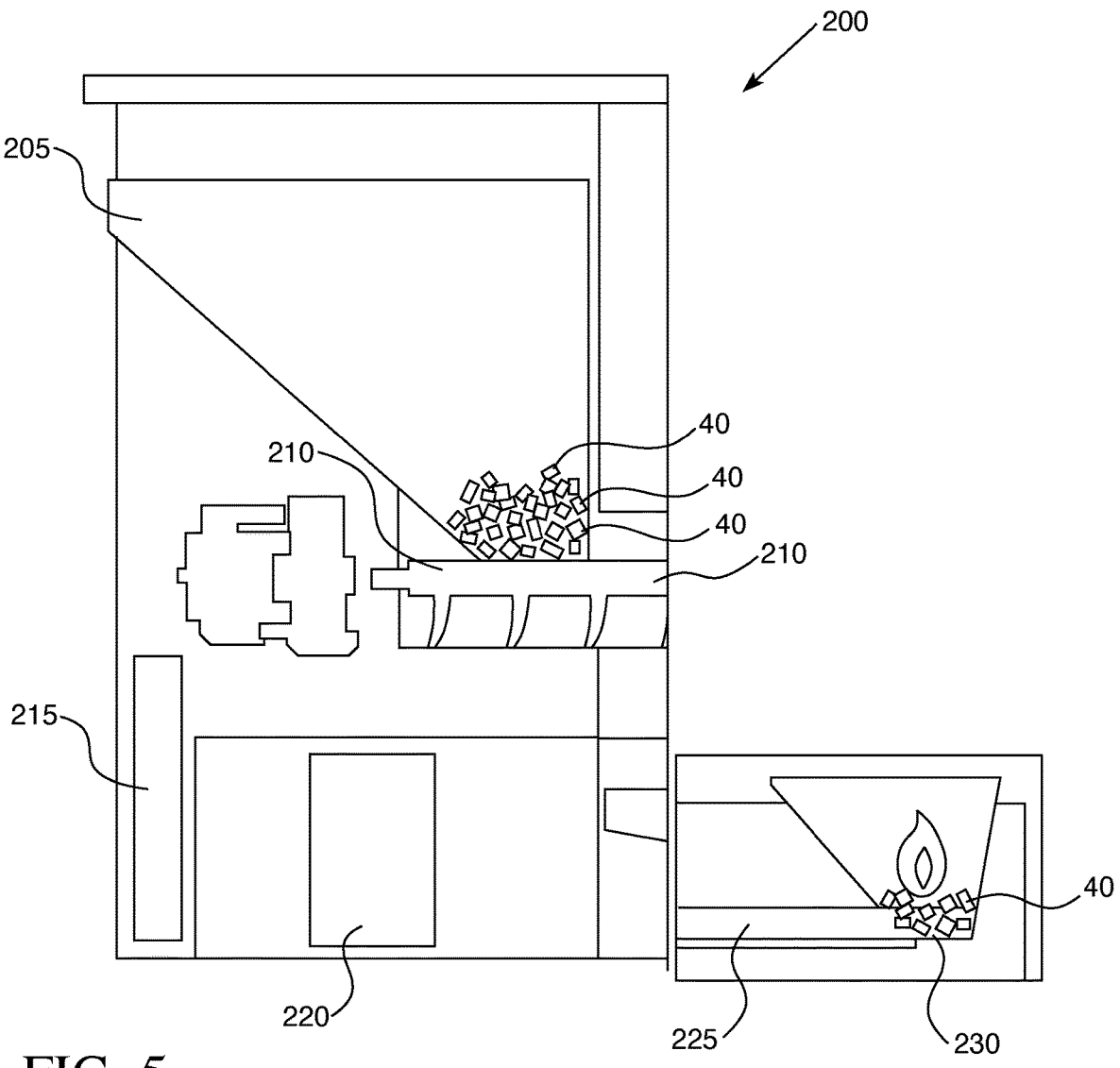
FIG. 5 is an example of a standard pellet hopper assembly.
Figure 6:
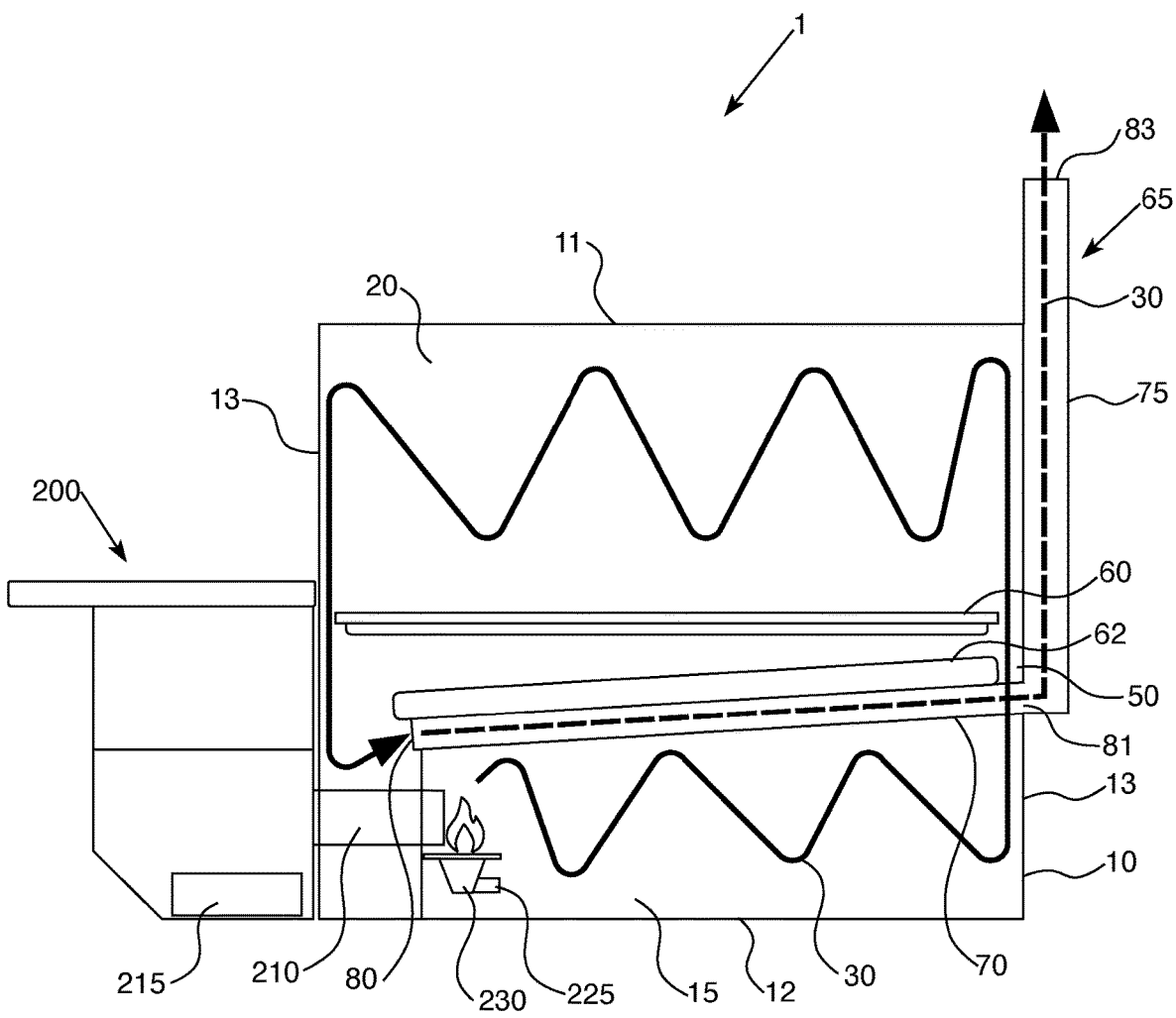
FIG. 6 shows an alternative embodiment of a smoker device of the present invention.

The pellet hopper assembly 200 of most embodiments of the present invention is separate from and slidably connected adjacent to one side of the smoking chamber 10 (see FIG. 1A through FIG. 4D and FIG. 6). The construction of the pellet hopper assembly 200 of one embodiment of the present invention is similar to any standard assembly 200 available in this technology field, except for the novel slidable connection disclosed herein. Hopper assemblies 200 usually are designed as a box made of stainless steel or a similar strong and heatproof material. Inside a standard self-feeding hopper assembly 200 is a hopper 205 (which holds the unheated pellets 40), a firepot 230 (in which the pellets 40 burn), an auger 210 (which moves the pellets 40 from the hopper 205 to the firepot 230), a fan 215 to circulate air for combustion, and an igniter 225 (to ignite the pellets 40). Some versions of hopper assemblies 200 have a firepot 230 that is integral to the hopper assembly 200. Alternatively, the fire pot 230 can be a separate component that connects to or interacts with the hopper assembly 200 and the smoker device 1 (as shown in FIGS. 5 and 6). Standard hopper assemblies 200 frequently also have a proportional-integral-derivative control (a "PID Controller 220") to maintain the temperature within the smoking chamber 10. One example of a standard hopper assembly 200 having these various parts is shown in FIG. 5.

Figure 1B:
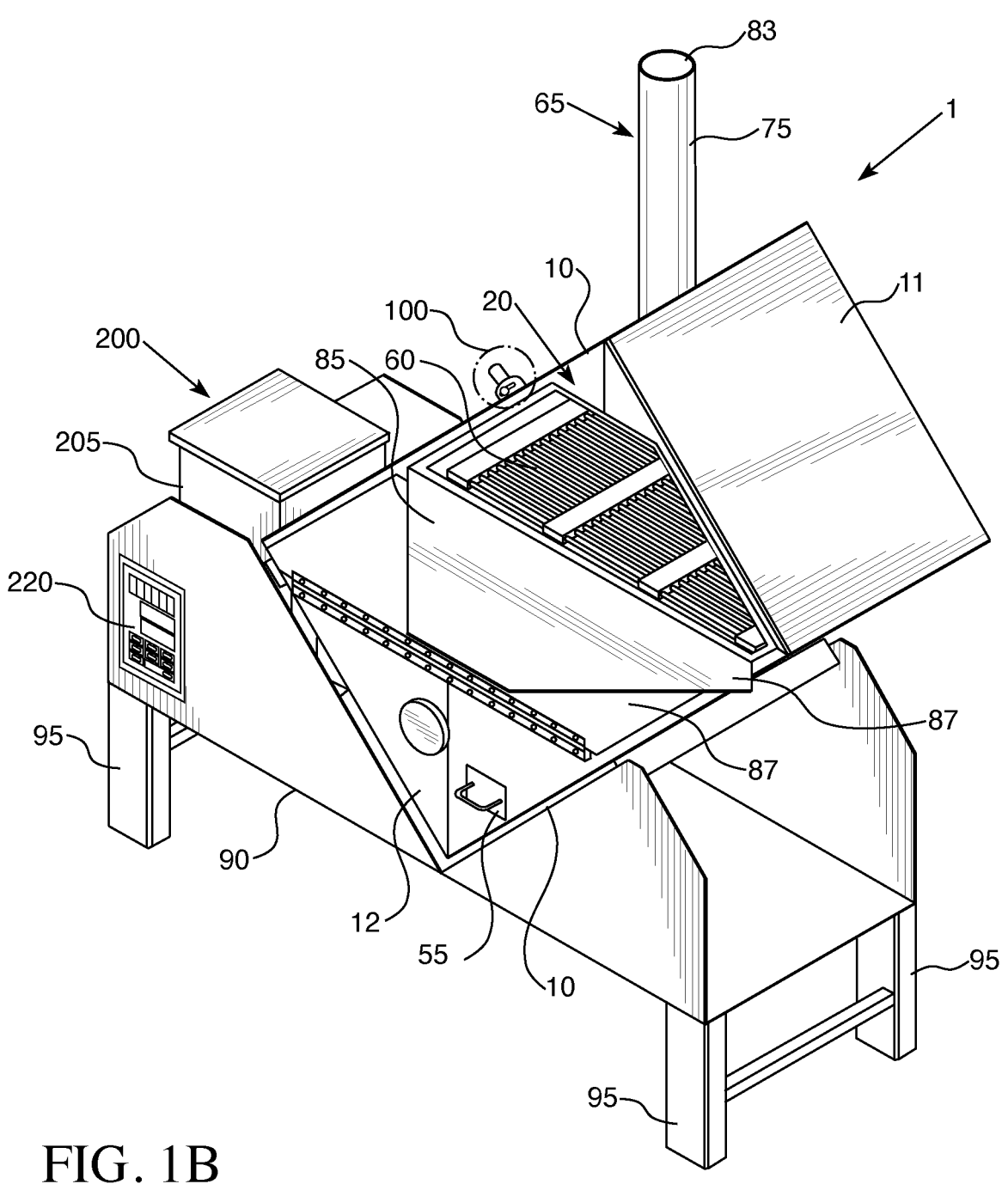
FIG. 1B is another view of the smoker device of FIG. 1A with the smoking chamber door partially open to show the inside of the smoking chamber.
Figure 2:
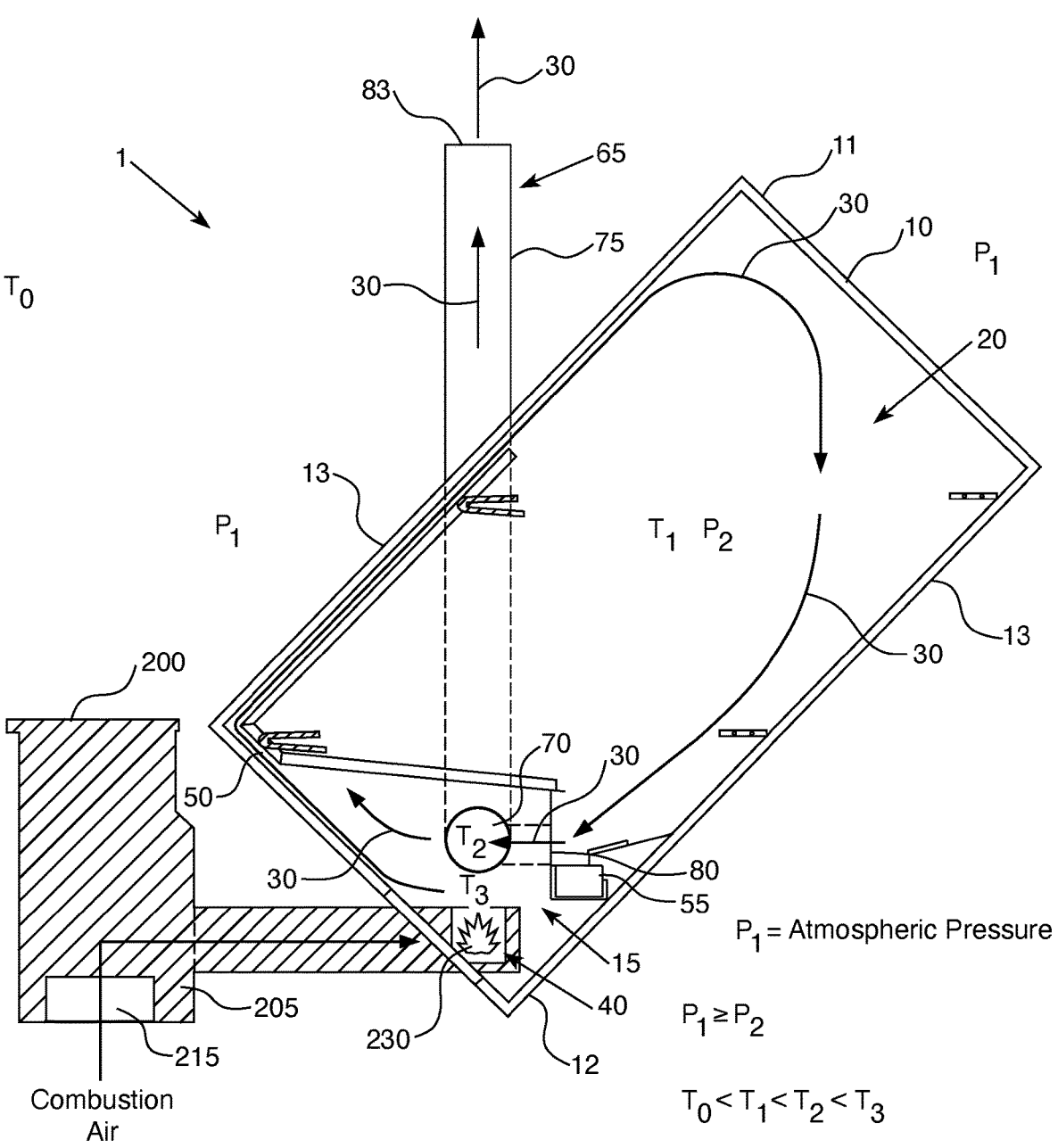
FIG. 2 illustrates the movement of smoke within the smoking chamber of one embodiment of the present invention and illustrates the pressure and temperature variations within the chamber during use.

Two exemplary (but non-limiting) embodiments of smoker devices 1 of the present invention, are exemplified by the designs in FIGS. 1A, 1B, 2, 3, 4A through 4D, and 6. FIG. 2 shows an embodiment of a smoker device 1 having a diamond-shaped or oriented smoking chamber 10 and FIG. 6 shows an embodiment having a horizontal or rectangular-shaped smoking chamber 10. The following elements of various embodiments of smoker devices 1 of the present invention can be incorporated into smoking chambers 10 having a variety of shapes and orientations. As described more fully herein, certain smoking chamber orientations have different advantages, but various orientations and shapes can incorporate the novel elements of the present invention. These elements include a smoker device 1 and smoking chamber 10 configured so that: (1) all smoke and other combustion gasses generated by the burning of fuel (e.g., pellets, etc.) is directed to follow a circulation path over the cooking surface 60 and then enter the exhaust pipe 70 through inlet 80 under the cooking surface 60; (2) an exhaust pipe 70 is located over the burner/heat source/firepot 230 so that the exhaust gasses and smoke are reheated before leaving smoking chamber 10 and discharging to the outside of smoker device 1; (3) exhaust gasses and smoke are reheated upon entry into exhaust pipe 70 whereby the draft is increased; and (4) the smoking chamber 10 operates at negative pressure $(P_2)$, that is pressure less than or equal to atmospheric pressure $(P_1)$ at the location of the smoker device 1 in question (negative pressure may be applied by mechanical means such as an exhaust fan, venturi, or alternately by the draft of the exhaust chimney or exhaust assemblies).

The smoker devices shown in FIGS. 2 and 6 have a smoking chamber 10 having a top 11, a bottom 12, and (depending upon the shape) at least one side 13, which create a chamber 10 that is divided into at least two sub-chambers 15 and 20. The at least one side 13 connects to the top 11 and the bottom 12 to enclose the smoking chamber 10. In one embodiment of the present invention (shown in FIGS. 1A through 4D), the smoking chamber has a diagonal longitudinal axis with an upper section and a lower section, but alternative variations are included within the scope of this invention including an essentially vertical longitudinal axis (shown in FIG. 6) and alternative embodiments having a longitudinal axis of chamber 10 at varying angles and orientations. For most embodiments of the present invention, the smoking chamber 10 is divided into a first sub-chamber 15 that is oriented at least partially below the second sub-chamber 20. The smoking chamber 10 is usually mounted on or sits on a support structure 90 and is divided into a first sub-chamber 15 in the lower section of the smoking chamber 10, which includes the firepot 230, and a second sub-chamber in the upper section of the smoking chamber 10, which contains the cooking surface 60 (usually grates 60). Referring to FIG. 2, the first sub-chamber 15 encompasses the location of the burning pellets 40 and the firepot 230 and is where the smoke and heat 30 is produced. The second sub-chamber 20 is where the food is located for heating, cooking, and smoking. As shown in FIG. 2, the first sub-chamber 15 in this depicted embodiment, is open to the second sub-chamber 20 above and to the left of the firepot 230 so that smoke 30 and other gases, as they circulate around the inside of chamber 10 do not reenter sub-chamber 15 and instead are drawn into inlet 80. The location of inlet 80 can change in other embodiments and, for example, be located to the right of firepot 230 as shown in FIG. 2 (or opposite and distant from hopper assembly 200). In one embodiment, inlet 80 has a predetermined size that is sufficient to facilitate negative pressure as between the inside of the smoking chamber 10 and the outside or ambient environment. As a result of this arrangement, the smoke and gasses that circulate through the second sub-chamber 20 enter the exhaust assembly 65 through the exhaust pipe inlet(s) 80, but essentially do not remix with the air, smoke and gasses in the first sub-chamber 15. This system of chambers forces the heat and smoke 30 to follow a specific path from the first sub-chamber 15 through second sub-chamber 20 (cooking, smoking, and heating chamber) before entering the exhaust system through inlet 80 where it is reheated, thus, increasing the draft before leaving the smoking chamber 10 and being discharged to the outside.

In most but not all, embodiments of the present invention, one or more slanted drip pans 62 subdivide the second sub-chamber 20 into smaller smoking areas. These divisions of the smoking chamber 10 and the second sub-chamber 20 are illustrated in FIGS. 1B, 2, 3, 4A, 4B and 4D. FIG. 6 shows a smoking chamber 10 having a single grate 60 (or cooking surface) and a single drip pan 62 and a single cooking sub-chamber 20.

In most embodiments of the present invention, the smoking chamber 10 is adjacent to and removably connected to the hopper assembly 200; however, when in use, the firepot 230 sits within the smoking chamber 10, and specifically within the first sub-chamber FIGS. 2 and 6 illustrate two possible hopper assembly 200 arrangements for the present invention and FIG. 5 illustrates a standard hopper assembly 200. As shown in FIG. 2, the smoking chamber 10 of one embodiment of the present invention comprises two sub-chambers 15 and 20. The first sub-chamber 15 encompasses the firepot 230 and the burning pellets 40, which create the smoke 30. As used herein, the term "smoke 30" generally refers to the heated smoke, air, combustion gasses, and any other gasses that circulate throughout the smoking chamber 10. The second sub-chamber 20, also shown in FIGS. 2, 3 and 6, is the chamber in which the food is heated, smoked or cooked. As shown in FIGS. 2 and 6, the second sub-chamber 20 is located fully or somewhat above the first sub-chamber 15.

An exhaust assembly 65 vents the smoke 30 that has circulated through the smoking chamber 10. For most embodiments of the present invention, the exhaust assembly comprises an exhaust pipe 70, an exhaust stack 75, at least one exhaust pipe inlet 80, and an outlet 83. In most embodiments of the present invention, the exhaust pipe 70 runs substantially horizontally with an orientation transverse to the longitudinal axis of the smoking chamber 10 and is located directly above the firepot 230 in the first sub-chamber 15 and the exhaust pipe 70 has at least one inlet 80 and an outer end 81 extending at least to the end of and in some arrangements out of the smoking chamber 10 (see FIG. 6). The outer end 81 connects to, or becomes, the exhaust stack 75, which runs essentially vertically along the exterior of the second sub-chamber 20, as shown in FIGS. 2, 4A, and 6. In one alternative embodiment, the exhaust stack 75 can run vertically through the interior of the smoking chamber 10. However, the geometry and orientation of exhaust pipe 70 and exhaust assembly can vary; it is not limited to the embodiments shown in the FIGS. 2, 4A and 6. The exhaust stack 75 extends upward to vent the hot air and smoke 30 from the smoking chamber 10. For most embodiments of the present invention, the smoke 30 originates in the first sub-chamber moves through a chase 50 and into the second sub-chamber 20. The smoke 30 circulates through the second sub-chamber 20 as shown in FIGS. 2 and 6 and then enters the one or more exhaust pipe inlets 80 and moves into the exhaust pipe 70. The smoke 30 travels along the exhaust pipe 70, which runs through the first sub-chamber 15, to the exhaust stack 75 and exits the exhaust stack 75 at its outlet 83. For the preferred embodiment of the present invention, the exhaust pipe 70 is running more or less horizontally through the first sub-chamber 15 and above the firepot 230. For the preferred embodiment of the present invention, the outlet 83 of the exhaust stack 75 is the tallest or highest point of the smoker device 1. The exhaust pipe inlet 80 is one or a plurality of holes, tubes or similar structures into which the smoke 30 that has circulated through the second sub-chamber 20 enters the exhaust pipe 70. In preferred embodiments of the present invention, the exhaust pipe 70 originates over and 70 is located directly over the firepot 230.

Most embodiments of the smoker device 10 of the present invention utilize drip pans 62 and grates 60. The one or more drip pans 62 are usually slanted, or in an angled orientation such that the drip pans 62 slope downward toward the at least one side 13 of the smoking chamber 10, and span the distance across the second sub-chamber 20, or the interior of the smoking chamber 10, as shown in FIGS. 4A, 4B, and 6. The drip pans 62 act as baffles and control both the grease 57 and food drips and the path of the smoke 30 within the second sub-chamber 20. As shown in FIG. 4A and in embodiments where longitudinal embodiments of chamber 10 have a diagonal or inclined orientation, the drip pans 62 are mounted at a slight angle to funnel the grease 57 to the exterior wall of the smoking chamber 10, which in some embodiments angle down and towards the grease catcher 55. "Grease 57" is used herein to represent any substances that falls or drips off the food or cooking surface 60 including, but not limited to, grease, food, food drippings, crumbs, and ingredients (like marinades). FIG. 6 illustrates an angled drip pan 62 in a substantially horizontal and rectangular smoking chamber 10. As shown in FIGS. 4A, 4B and 4D, the drip pans 62 also divide the second sub-chamber 20 into sections and control the flow of smoke 30 within those sections. FIGS. 4A through 4D illustrate the interior of a smoking chamber 10 with the smoker door(s) 85 removed. FIGS. 1A and 1B show a smoker device 1 having multiple hinged doors 85 or these variations could be constructed to have a single door 85 with multiple panels 87 that open to provide access to different cooking surfaces. Various embodiments of the present invention can have doors 85 of a variety of sizes, shapes, and designs to enable access to the smoking chamber 10. Additionally, various embodiments of the present invention can be configured to have a single door 85 structure with hinged, pivoting, or moveably-connected panels 87 that provide access to different cooking surfaces 60.

Grates 60 support the food in the smoking chamber 10. The one or more grates 60 are mounted in an essentially level or horizontal position and span the smoking chamber 10 as shown in FIGS. 1B, 4D, and 6. In most but not all embodiments where both drip pans 62 and grates 60 are used in the smoking chamber 10, the grates 60 generally sit above the drip pans 62. The grates 60 of the present invention can have a traditional grill or smoker grate structure (preferred embodiment) or they can have a mostly solid surface with small holes or perforations through which the grease 57 drips. Grates 60 of a variety of structures, materials, and designs work with the present invention and different styles of grates 60 can be used for different types of cooking, different foods, or different smoker device 1 designs. All such variations of grates 60 are included within the scope of the present invention.

The smoking chamber 10, according to one embodiment of the present invention, also houses a grease catcher 55 in some embodiments (shown in FIGS. 1A through 4B and 4D). The grease catcher 55 is located to catch the grease as the grease runs or drips off the slanted drip pans 62. The size, shape and exact location of the drip pan(s) 62 is determined by the size, shape, number of, and orientation of the drip pans 62 and the design of the smoking chamber 10. In various embodiments of the present invention, there can be one or more drip pans 62 per cooking chamber 20. The drip pans 62 typically are removable for cleaning. However, the drip pans 62 can be permanent and cleaned while inside of the smoking chamber 10.

In one embodiment of the present invention, the combination of the smoking chamber 10 and the hopper assembly 200 is supported by a table-like support structure 90 with legs 95 as illustrated in FIGS. 1A, 1B and 4D, or with alternative support mechanism instead of legs 95. This support structure 90 can be any design similar to what is known in the field for smokers and grills to enable the smoker device 1 to be located at a comfortable user height. The support structure 90 can have wheels, be mobile, or be stationary. The hopper assembly 200 and/or smoking chamber 10 can be permanently or removable connected to the support structure 90.

In one preferred embodiment of the smoker device 1, the entire hopper assembly 200, including the firepot 230, is designed to slide out or separate from the smoking chamber 10. This facilitates the cleaning of the firepot 230 and surrounding structures. The user can clean the firepot 230 without having to navigate the smoking chamber 10 and the support structure 90. One design option to accomplish this removability is to locate the hopper assembly 200 on one or more glide tracks or slides, which enables the assembly 200 to slide towards and away from the smoking chamber 10. In the preferred embodiment of the present invention, the hole or location through which the hopper assembly 200 inserts into the smoking chamber 10 is configured with a seal, flange, and/or gasket. An option on some embodiments of the present invention is a latch or locking mechanism to secure the hopper assembly 200 to the smoking chamber 10. Securing the connection between the smoking chamber 10 and the hopper assembly 200 can be configured to put pressure on or squeeze the seal, flange, or gasket to improve the seal as well.

In alternative embodiments of the present invention, as mentioned previously, the firepot 230 can be connected to or a part of the hopper assembly 200, the firepot 230 can be connected to the smoking chamber 10, or the firepot 230 can be a separate unit to itself, which integrates with the hopper assembly 200 and the smoking chamber 10.

Configuring a hopper assembly 200 to slidably insert into and be removed from a heating device works with a wide variety of devices that utilize hoppers assemblies 200, beyond smoker devices 1. A slidable hopper assembly 200 can be used with any heat producing device wherein the heat is generated by the burning of any combustible fuel, including but not limited to, pellets, wood, charcoal, propane, and natural gas.

Finally, in the preferred embodiments of the smoker device 1 of the present invention, all non-essential openings are sealed using gaskets or another appropriate sealing materials or techniques.

As will now be explained, it is the individual elements and their combination and design in different embodiments of a smoker device 1 that establish the novelty and significant improvement in performance of the smoker devices 1 of the present invention over other technologies in this field. The points of novelty that are described in detail below can be incorporated individually into smoker devices 1 to achieve individual improvements over smokers currently on the market or they can be combined to achieve a smoker device 1 that operates significantly better on several metrics than those currently on the market. As described above and below, the configuration of parts of smoker devices 1 of the present invention result in the following five distinct advantages over prior art.

First, at least some embodiments of smoker devices 1 according to the present invention are configured so that the smoke and other combustion gasses 30 generated by the burning of the fuel or pellets 40 is forced to follow a circulation path over the cooking surface in the second sub-chamber 20 and then enter the exhaust pipe 70, which is located under the cooking surface or grate(s) 60. This is illustrated in FIGS. 2 and 6.

Second, at least some embodiments of smoker devices 1 according to the present invention operate at negative pressure, which is defined as pressure less than or equal to atmospheric pressure at the location of the device in question. The negative pressure may be applied by mechanical means (e.g., an exhaust fan or venturi) or alternately by the draft of the exhaust chimney or assembly 65. One embodiment of this negative pressure arrangement is illustrated in FIG. 2.

Third, at least some embodiments of smoker devices 1 according to the present invention are configured to re-heat the exhaust gas or smoke 30 within the exhaust pipe 70 thus increasing the draft. As discussed more fully below, draft generally is increased because the re-heated gases are less dense than the cooler gasses and create a pressure differential. Such a geometry results in sufficient draft to create negative pressure within the smoker device 1. This is accomplished by arrangements illustrated, by way of example, in FIGS. 2, 4A and 6. However, the geometry and orientation of exhaust pipe 70 and exhaust assembly 65 can vary; it is not limited to the embodiments shown in the FIGS. 2, 4A and 6.

Fourth, at least some embodiments of smoker devices 1 according to the present invention route all the combustion gas or smoke 30 through the exhaust pipe 70, which itself is located over the heating element, burner, or firepot 230, before the exhaust pipe 70 exits the smoking chamber 10 and discharges the combustion gases to the outside. This is accomplished by arrangements illustrated in FIGS. 2, 4A and 6.

Fifth, some embodiments of the present invention encompass a smoker device 1 that has a firepot 230 (usually as part of a hopper assembly 200) that slides into and out of the smoking chamber 10. This is shown in FIGS. 1A, 2, 4A, 4B and 6.

In some preferred embodiments of the present invention, as shown in FIGS. 2 and 6, the smoker devices 1 have the exhaust pipe 70 running more or less horizontally through the smoking chamber 10, specifically through the first sub-chamber 15, and located directly above the firepot 230, with an exhaust inlet 80 positioned on a side of exhaust pipe 70 (FIG. 2) and the outlet 83 of the exhaust assembly 65 being the tallest or highest point of the smoker device 1. In alternative embodiments of the present invention, the exhaust inlet 80 can be located on the same side as the hopper assembly 200 (FIG. 6) or along any side of the exhaust pipe 70 as long as the smoke 30 is forced to travel around the second sub-chamber 20 before entering the inlet 80 and without remixing with smoke 30 and gasses first emitted in the first sub-chamber 15. More specifically, because of its location, the exhaust pipe 70 and the smoke 30 pulled inside of it are being heated (and reheated) directly both by the radiant energy and convection from the firepot 230. The exhaust assembly 65 operates on the principle that hot air rises such that air, smoke and gasses heated by the burning pellets 40 in firepot 230 will rise up exhaust stack 75 and out of chamber 10. The rising hot smoke 30 creates a pressure differential between the pressure P2 shown within chamber 10 in FIG. 2, and pressure P1 outside of chamber 10. This pressure differential is known as the draft or pulling power of the chimney or exhaust assembly 65. This pressure differential and resulting draft or pulling power sucks smoke 30 into exhaust pipe 70 and exhaust stack 75.

In the embodiment of the invention shown in FIG. 2, there are four different temperatures noted. To is the ambient atmospheric temperature, or the temperature of the environment around the smoker device 1. $T_1$ is the temperature inside the second sub-chamber $T_2$ is the temperature of the reheated smoke 30 in the exhaust pipe 70 above the firepot 230 (otherwise referred to the flue gas temperature). $T_3$ is the temperature at or immediately above the firepot 230 in the first sub-chamber 15. When the smoker device 1 is operating, the relative temperatures in one preferred embodiment are as follows: $T_0<T_1<T_2<T_3$. The hottest temperature $T_3$ of the smoke 30 in the smoking chamber 10 is directly above the burning pellets 40 in the firepot 230 and the second highest temperature is at $T_2$ inside exhaust pipe 70. In this embodiment, an ultimate net draft is created by the temperature (density) difference between the ambient air temp $T_0$ and the flue gas temp $T_2$. The larger that difference, the more draft is created. However, in embodiments where there is a fan 215 pushing the combustion air into the smoking chamber 10, the draft must outpace the push from the fan 215, otherwise the smoker device 1 will operate at positive pressure. The reheating of the exhaust gas boosts the temperature difference between the ambient air temp $T_0$ and the flue gas temp $T_2$ and provides enough boost to stay ahead of the fan 215.

The resulting motion or convection current of air, gasses and smoke 30 is shown as having a clockwise direction in FIG. 2, with the convection current of air, gasses and smoke 30 starting above firepot 230, moving upward along the angled, straight or curved walls of chamber 10 facing toward or closest to hopper assembly 200 to sub-chamber 20 and then downward along the angled, straight or curved walls of chamber 10 facing and further away from hopper assembly 200, whereby the air, gasses and smoke 30 are pulled into the exhaust inlet 80, where they are reheated and drawn up exhaust stack 75. The design of the invention shown in FIG. 2, including (i) the relative positions of the firepot 230 and exhaust pipe 70, the location of the exhaust inlet 80, and (iii) the angled orientation of the sides of chamber 10 in some embodiments operates to circulate the smoke 30 within chamber 10 in an improved manner to add smoked flavor to the food being cooked or smoked.

FIG. 6 shows a similar but opposite arrangement wherein the motion or convection current of air, gasses and smoke 30 is shown as having a counter-clockwise direction with the convection current of air, gasses and smoke 30 starting above firepot 230, moving towards the chase 50 that connects the first sub-chamber 15 and the second sub-chamber 20, then upward along the angled, straight or curved walls of chamber 10 on the side opposite the hopper assembly 200 into the second sub-chamber 20, around and towards the opposite wall (closest to the hopper assembly 200) and then downward along the angled, straight or curved walls of chamber 10 facing whereby the air, gasses and smoke 30 are pulled into the exhaust inlet 80. Once in the exhaust pipe 70, the air, gasses and smoke 30 is reheated and drawn up exhaust stack 75. The design of the invention shown in FIG. 6, including (i) the relative positions of the firepot 230 and exhaust pipe 70, and (ii) the location of the exhaust inlet 80 operates to circulate the smoke 30 within chamber 10 in an improved manner to add smoked flavor to the food being cooked or smoked. This circulation of smoke 30 substantially improves temperature control and consistency in cooking sub-chamber 20.

The circulation of the smoke 30 is illustrated in FIG. 2 along with relative variations in pressure and temperature within the different areas of the smoker device 1. Research on the operations of the present invention indicates that the second sub-chamber 20 operates below atmospheric pressure, which results in almost no smoke 30 exiting the device 1 anywhere other than through the exhaust stack 75. The smoke 30 circulation that results from this design has many benefits, which establish the present invention as superior to many smokers in the field. First, the smoke 30 circulation pattern eliminates the need for any fan in the smoking chamber 10 to circulate the smoke 30, which is needed in some commercial devices to move the smoke 30 throughout the smoking chamber 10. Second, the circulation pulls most of the smoke 30 efficiently through the smoker device 1 and out through the exhaust stack 75 without significant smoke 30 leaking out of other parts or areas of the smoker device 1. The design of many traditional smokers and hybrid smoker-grills locates the exhaust stack on the top of the device so that the smoke 30 travels up through device but does not circulate through the cooking chamber. The smoker device 1 of the present invention is configured to encourage the smoke 30 to circulate throughout the smoking chamber 10, which results in more flavorful food and a more consistent temperature and smoking environment. As such, the improved circulation of the present invention is more effective and efficient than existing smoker technologies. Preferred embodiments of a smoker device 1 of the present invention will have the seams, connection points, junctures, and other connection points sealed wherever possible to avoid having the smoke 30 escape the smoker device 1 from anywhere other than the outlet 83 until the smoker device 1 is fully heated and running. Sealing any holes, seams, etc. to avoid the loss of smoke 30 is not novel in this field. However, most existing technologies still have significant smoke 30 loss from areas of the smoker that are not the exhaust stack even with traditional sealing. The design of the smoker device 1 of the present invention, including the highly efficient draft and pull of smoke 30 through the smoking chamber 10, minimizes the loss of smoke 30 from anywhere other than the outlet 83 to a degree not seen by other technology in this field. Unlike most other smokers and hybrid smokers sold to this point, almost no smoke 30 escapes the smoker device 1 of the present invention from any location other than the outlet 83.

While in no way recommended or endorsed to be used this way, experimentation on the device 1 included running an exhaust duct from the outlet 83 to a window or door so that the smoker device 1 of the present invention can be operated in a semi-enclosed outdoor space like a patio or garage or car port without noticeable smoke 30 leaking into the area surrounding the smoker device 1. This achievement presents several advantages over the existing art. First, it enables the smoker device 1 of the present invention to be used semi-indoor settings, which is useful in settings such as covered porches or inside garages. Second, the fact that most of the smoke 30 exits the device 1 from the outlet 83 means that the smoke 30 from the present invention can be directed towards or away from certain areas, such as away from a structure like a house or away from locations where people are sitting. Many existing technologies lack this efficient management of smoke exiting from their devices.

Another unique design element of some of the embodiments of the present invention, as discussed above, is the use of sloped or angled smoking chambers 10 having a diagonal longitudinal axis, which is shown in FIGS. 1A through 4B and 4D. While most traditional smokers and hybrid smoker-grills have level, rectangular cooking chambers, the smoking chamber 10 of some embodiment of the present invention sit angled upon the support structure 90 and, as shown in FIGS. 1A, 1B, 2 and 3, the longer dimension of the rectangular smoking chamber 10, as viewed from the side, tilts away from the location of the hopper assembly 200. In alternative embodiments, at least the two sides 13 of chamber 10 are angled and meet at the bottom 12 and the upper enclosed structure of chamber 10 can have other shapes such as, without limitation, a rounded top or multiple interconnected panels that enclose the top of chamber 10. In alternative embodiments, the smoking chamber 10 can also have a more traditional, rectangular structures (see FIG. 6). In some embodiments the sides 13 are angled at about 45-degrees from the horizontal plane at the bottom 12 at which sides 13 meet (an example of which is shown in FIG. 2). This angle can range from about 30-to 60-degrees in other embodiments. Sides 13 are preferably flat but can have a curved shape also.

This optional angled design or orientation results in at least two and up to four angled sides 13 that create certain advantages. First, this angled design aides the internal circular movement of the smoke 30 up towards the top 11 of the second sub-chamber 20, around the interior of the second sub-chamber 20, and then out of the second sub-chamber 20 (as shown in FIG. 2). This circulation contributes to the benefits of the present invention as discussed above.

Second, this angled or diagonal orientation of the smoking chamber 10 also better enables the grease 57 to drip down the angled side walls 13 and into one easy to clean location, namely, the grease catcher 55. This facilitates faster, easier and less messy clean-up of the grease 57 from the smoker device 1. Grease management is an exceptionally important issue in smoking. In one preferred embodiment the smoker device 1 is designed to cause the grease 57 to collect in a grease catcher 55, which is located away from the pellets 40. Effective and efficient grease 57 collection also is facilitated by the inclined (or declined depending upon the orientation) drip pans 62, which, when slanted, divert the grease 57 towards the angled side wall 13 and to an optional trough which then filters down to the grease catcher 55. However, FIG. 6 illustrates a smoker device 1 according to the present invention that has a more traditionally oriented smoking chamber 10. When the other design elements shown in FIG. 6 and discussed herein are incorporated into a smoker device 1 with a traditional shape and orientation a significant improvement in performance is achieved.

The design of some embodiments of a smoker device 1 of the present invention also result in a smoker that is significantly easier to clean than most other smokers or smoker-grills on the market. For traditional technologies, the user needs to open the lid, remove the grates, remove the deflector, shop vac out all the ashes, and then put everything back together. This process is messy, complicated, and necessitates working in and around the cooking area and all the grease of a traditional smoker to clean out the firepot. The smoker device 1 of the present invention is designed so the user can slide out the entire hopper assembly 200 and clean the ashes from inside of it. This is much faster and neater than cleaning existing technologies. As discussed above in connection with FIGS. 5 and 6, the hopper 205 is attached to the pellet auger 210 (or other feed system) and the associated auger tube is attached to the fire pot 230. The entire assembly slides out as one unit.

There are a variety of additional elements and variations that can be combined with the smoker device 1 of the present invention to create a wide variety of alternative embodiments of the present invention. One embodiment of a smoker device 1 of the present invention incorporates a damper 100 near the smoke chase 50 on the side of the smoking chamber 10 adjacent to the hopper assembly 200. One embodiment of a damper 100 is illustrated in FIGS. 4A and 4B and shown in detail in FIG. 4C. This damper 100 allows for the tuning of the smoke 30, humidity and temperature within the smoke cabinet 10. An alternative embodiment of a smoker device 1 of the present invention incorporates a humidifier into the device 1 to generate steam inside the smoker device 1 to keep the food moist. Another embodiment of the smoker device 1 of the present invention utilizes a modular design for multiple burners inside the smoking chamber 10 to enable separate burners to be run together or independently to provide smoke 30 or heat as desired. The present invention also encompasses an optional function that creates smoke 30, but not heat, so that a user can smoke without cooking/heating the food. Finally, yet another alternative embodiment of the present invention incorporates a damper 100 between the chase 50 and a divided second sub-chamber 20 to help direct smoke 30 into the lower section of the divided second sub-chamber 20 and the rest of the smoke 30 goes to the upper section of the second sub-chamber 20. This allows the user to control the path the smoke 30 takes within a divided second sub-chamber 20. This will optionally allow for the divided second sub-chamber 20 to operate at a different temperature than the remaining portion of sub-chamber 20.

While the disclosure has been described in detail and with reference to specific embodiments thereof, it will be apparent to one skilled in the art that various changes and modifications can be made thereto without departing from the spirit and scope of the embodiments. Thus, it is intended that this application covers modifications and variations of this disclosure provided they come within the scope of the appended claims and their equivalents.

The invention claimed is:

1. A smoker device for smoking or cooking food comprising:
   a smoking chamber divided into a first sub-chamber adjacent to a second sub-chamber, wherein the second sub-chamber has an internal temperature;
   an exhaust pipe located within the first sub-chamber and above a firepot in the first sub-chamber, the exhaust pipe having at least one inlet and an outer end; and
   an exhaust stack connected to the outer end of the exhaust pipe and extending upward to vent hot air and smoke from the smoking chamber; and
   whereby the firepot reheats the air and smoke in the exhaust pipe to a higher temperature than the internal temperature and thereby creates a circulation path for the air and smoke in which the air and smoke is heated in the first sub-chamber, circulates into and through the second sub-chamber, reenters the first sub-chamber, and is drawn into the at least one inlet and up the exhaust stack.

2. The smoker device of claim 1, wherein the smoking chamber comprises:
   a top;
   a bottom;
   at least one side connected to the top and the bottom to enclose the smoking chamber; and
   at least one door on one of the at least one sides.

3. The smoker device of claim 1, also comprising:
   a support structure upon which rests a hopper assembly and the smoking chamber.

4. The smoker device of claim 1, wherein the exhaust pipe extends substantially horizontally through the first sub-chamber.

5. The smoker device of claim 2, further comprising:
   at least one grate mounted horizontally within the smoking chamber;

at least one drip pan mounted within the smoking chamber and below the at least one grate in an angled orientation whereby the drip pan slopes downward toward the at least one side of the smoking chamber; and a grease catcher.

6. The smoker device of claim 1, wherein the smoking chamber is angled to achieve a diagonal longitudinal axis to the smoking chamber.

7. The smoker device of claim 1, wherein the smoking chamber is substantially horizontal to achieve a rectangular shape to the smoking chamber.

8. The smoker device of claim 1, also comprising a chase connecting the first and second sub-chambers.

9. The smoker device of claim 1, also comprising a hopper assembly adjacent to the smoking chamber that is operable to feed pellets from a hopper in the hopper assembly into the firepot to create smoke, wherein the firepot is located within the first sub-chamber during the smoking or cooking.

10. A smoker device comprising:

a smoking chamber comprising a first sub-chamber configured to house a firepot and an exhaust pipe and a second sub-chamber housing a cooking surface; wherein the temperature inside the first sub-chamber is the highest temperature in the smoking device and wherein the density of smoke inside the exhaust pipe is lower than the density of smoke inside the second sub-chamber to draw smoke through the second sub-chamber, thereby creating a smoke circulation path whereby smoke is heated in the first sub-chamber, travels through the second sub-chamber, and is drawn back into the first sub-chamber to be re-heated and then into the exhaust pipe as a result of density differences within the smoker device.

11. The smoker device of claim 10, further comprising a chase that is connected to and joining the first and second sub-chambers to each other.

12. The smoker device of claim 10, wherein the smoke and other combustion gasses generated by the firepot located in the first sub-chamber are directed, through configuration of the smoking chamber, to follow a circulation path across the cooking surface and then enter the exhaust pipe under the cooking surface.

13. The smoker device of claim 1, wherein heat is generated by the burning of pellets or other combustible fuel also comprising:

a hopper assembly that houses the pellets or other combustible fuel, wherein the hopper assembly is slidably detachable from the smoking chamber.

14. The smoker device of claim 1, wherein the circulation path is created in part by a lower ambient temperature outside of the smoking chamber and a higher temperature inside the exhaust pipe above the firepot.

15. The smoker device of claim 1, wherein all heated air and smoke within the smoking chamber is routed through the exhaust pipe and then outside the smoking chamber.

16. A smoker device comprising:

a smoking chamber comprising a first sub-chamber configured to house a firepot and having an exhaust pipe located within it and a second sub-chamber having a cooking surface located within it;

wherein the density of smoke inside the second sub-chamber is lower than the density of smoke inside the first sub-chamber and the density of smoke inside the exhaust pipe is lower than the density of smoke inside the second sub-chamber to draw smoke through the smoker device and following a circulation path across the cooking surface and then into the exhaust pipe located under the cooking surface.

17. The smoker device of claim 16, wherein the circulation path inside the smoking chamber is created at least in part by a mechanism selected from the group consisting of a fan, by creating a venturi effect, and by creating a draft in the exhaust pipe by heating the exhaust pipe and gases within it.

18. The smoker device of claim 16, also comprising an exhaust stack connected to the exhaust pipe to vent smoke out of the smoker device, wherein the draw of smoke through the smoking chamber and into the exhaust stack increases as the pressure differential between the smoke in the smoking chamber and the smoke in the exhaust stack increases.

19. A smoker device comprising:

a smoking chamber having a first sub-chamber and a second sub-chamber;

a heat source located within the first sub-chamber;

an exhaust pipe for venting exhaust gases from inside the smoking chamber and that is located within the first sub-chamber and above the heat source, whereby the heat source heats the exhaust gases in the exhaust pipe are reheated to a higher temperature than a temperature in the second sub-chamber, thereby decreasing the exhaust gases' density within the exhaust pipe and increasing the draw of smoke through the smoking chamber to create or increase the draft in the exhaust pipe.

* * * * *